(12) United States Patent
Fukuno et al.

(10) Patent No.: US 7,659,644 B2
(45) Date of Patent: Feb. 9, 2010

(54) BRUSHLESS MOTOR AND MANUFACTURING METHOD THEREOF

(75) Inventors: Fumio Fukuno, Kosai (JP); Takeo Noda, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 12/073,067

(22) Filed: Feb. 29, 2008

(65) Prior Publication Data

US 2008/0218009 A1 Sep. 11, 2008

(30) Foreign Application Priority Data

Mar. 9, 2007 (JP) .............................. 2007-060310

(51) Int. Cl.
*H02K 5/24* (2006.01)
(52) U.S. Cl. ...................................................... 310/51
(58) Field of Classification Search .................... 310/51
See application file for complete search history.

(56) References Cited

U.S. PATENT DOCUMENTS

| | | | | |
|---|---|---|---|---|
| 4,647,803 | A * | 3/1987 | von der Heide et al. | 310/51 |
| 4,952,836 | A * | 8/1990 | Robertson | 310/339 |
| 6,747,378 | B2 * | 6/2004 | Brackett | 310/51 |
| 6,826,010 | B2 * | 11/2004 | Yoshikawa et al. | 360/99.08 |
| 7,015,605 | B1 * | 3/2006 | Peter et al. | 310/51 |
| 7,056,218 | B2 * | 6/2006 | Komori et al. | 464/89 |
| 7,175,916 | B2 * | 2/2007 | Ikuta et al. | 428/476.9 |
| 2001/0023638 | A1 * | 9/2001 | Yamaguchi et al. | 92/165 R |
| 2006/0175926 | A1 * | 8/2006 | Best | 310/254 |
| 2008/0007125 | A1 * | 1/2008 | Koyama et al. | 310/27 |
| 2008/0009354 | A1 * | 1/2008 | Hodjat et al. | 464/87 |
| 2008/0143198 | A1 * | 6/2008 | Bl et al. | 310/51 |

FOREIGN PATENT DOCUMENTS

| | | |
|---|---|---|
| JP | U-02-146980 | 12/1990 |
| JP | 08182247 A * | 7/1996 |
| JP | A-10-028366 | 1/1998 |
| JP | 2002320349 A * | 10/2002 |

OTHER PUBLICATIONS

Machine Translation of JP 08182247 A, Japan, Jul. 1996, Suzuki et al.*
Machine Translation of JP 2002-320349 A, Japan, Oct. 2002, Sato et al.*

* cited by examiner

*Primary Examiner*—Quyen Leung
*Assistant Examiner*—Jose A Gonzalez Quinones
(74) *Attorney, Agent, or Firm*—Posz Law Group, PLC

(57) ABSTRACT

A centerpiece rotatably supports a rotatable shaft therein. A stator core is placed radially outward of the centerpiece. A generally cylindrical vibration isolator is made of a resilient material and is radially placed between the centerpiece and the stator core.

18 Claims, 12 Drawing Sheets

BRUSHLESS MOTOR AND MANUFACTURING METHOD THEREOF

CROSS REFERENCE TO RELATED APPLICATION

This application is based on and incorporates herein by reference Japanese Patent Application No. 2007-60310 filed on Mar. 9, 2007 and Japanese Patent Application No. 2008-23139 filed on Feb. 1, 2008.

BACKGROUND OF THE INVENTION

1. Field of the Invention

The present invention relates to a brushless motor and a manufacturing method thereof.

2. Description of Related Art

For example, each of Japanese Patent No. 3051827 and Japanese Unexamined Utility Model Publication No. H02-146980 discloses a brushless motor, which includes a vibration isolator made of a rubber material. In the brushless motor of Japanese patent 3051827 or Japanese Unexamined Utility Model Publication No. H02-146980, the vibration isolator is interposed between a stator core and a centerpiece, which rotatably supports a rotatable shaft of a rotor therein.

In the brushless motor, which has the vibration isolator of the above kind, it is important to reduce a motor noise without deteriorating a rotational balance of a motor main body of the brushless motor. Thus, there is a need for reducing the motor noise without deteriorating the rotational balance of the brushless motor.

SUMMARY OF THE INVENTION

The present invention is made in view of the above point. Thus, it is an objective of the present invention to provide a brushless motor, which can reduce a motor noise without substantially deteriorating a rotational balance of the brushless motor. It is another objective of the present invention to provide a manufacturing method of such a brushless motor.

To achieve the objectives of the present invention, there is provided a brushless motor, which includes a rotor, a centerpiece, a stator core and a generally cylindrical vibration isolator. The rotor includes a rotatable shaft. The centerpiece rotatably supports the rotatable shaft therein. The stator core is placed radially outward of the centerpiece. The vibration isolator is made of a resilient material and is radially placed between the centerpiece and the stator core.

To achieve the objectives of the present invention, there is also provided a manufacturing method of a brushless motor. According to this method, a stator core and a vibration isolator made of a resilient material are assembled together by engaging at least one inner peripheral engaging portion of the stator core to at least one outer peripheral engaging portion of the vibration isolator. A plurality of windings is wound around a plurality of salient poles of the stator core after the assembling of the stator core and the vibration isolator. A centerpiece and the vibration isolator are assembled together by axially clamping the vibration isolator between first and second clamping portions of the centerpiece and engaging at least one outer peripheral engaging portion of the centerpiece to at least one inner peripheral engaging portion of the vibration isolator after the winding of the plurality of windings.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A structure of a brushless motor 10 according to an embodiment of the present invention will be described.

Figure 1:
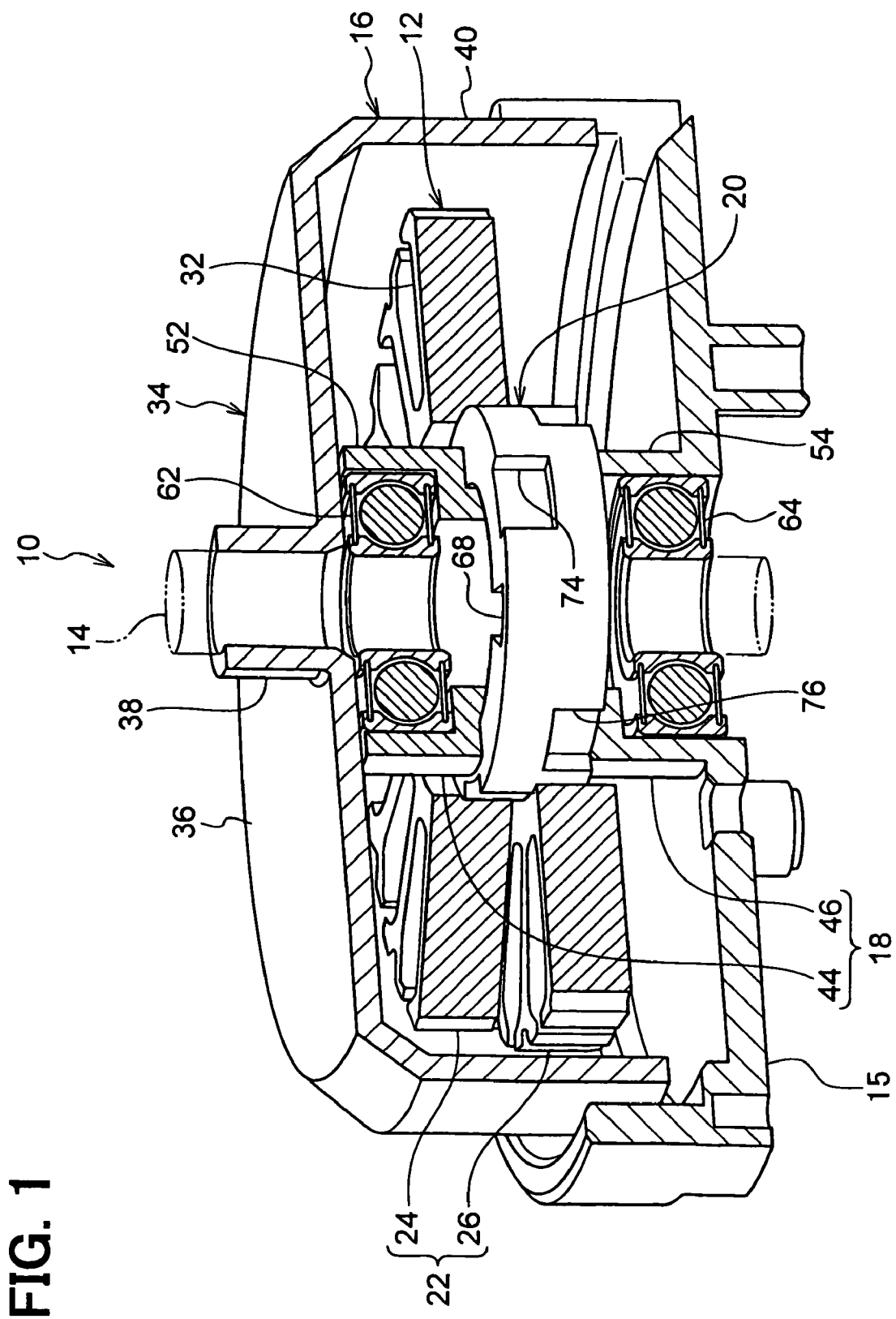
FIG. 1 is a partially fractured perspective schematic view of a brushless motor according to an embodiment of the present invention without an insulator, windings and rotor magnets.

FIGS. 1 to 9 show the brushless motor 10 of the present embodiment. The brushless motor 10 shown in FIGS. 1 to 9 is used as, for example, a fan motor for cooling a radiator of a vehicle (e.g., an automobile). As shown in FIG. 1, the brushless motor 10 includes a rotor 16, a stator 12 and a vibration isolator 20. The rotor 16 includes a cup-shaped rotor housing (upper motor housing) 34 and a rotatable shaft 14.

Figure 2:
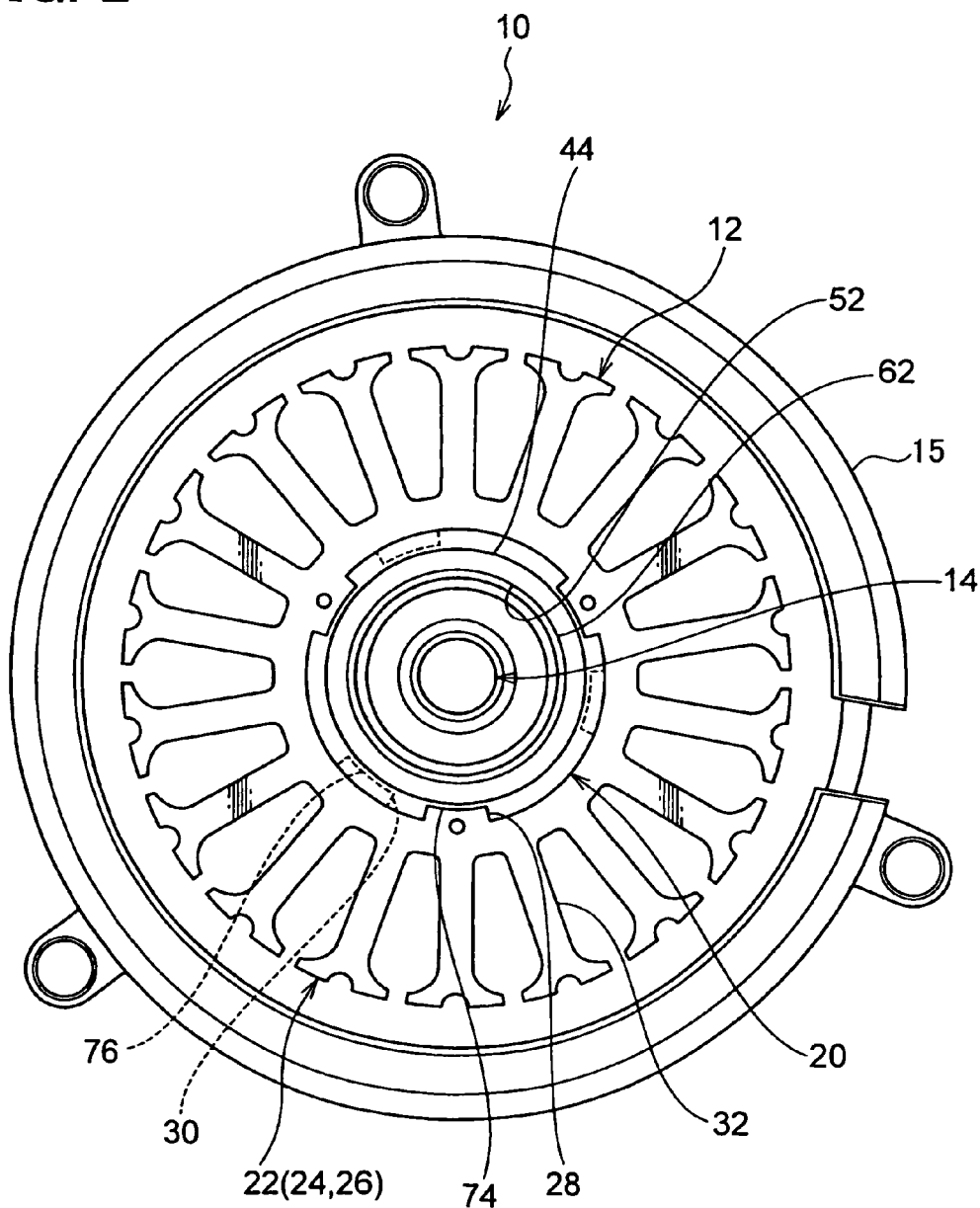
FIG. 2 is a schematic plan view of the brushless motor of FIG. 1 without a rotor housing.
Figure 3A:
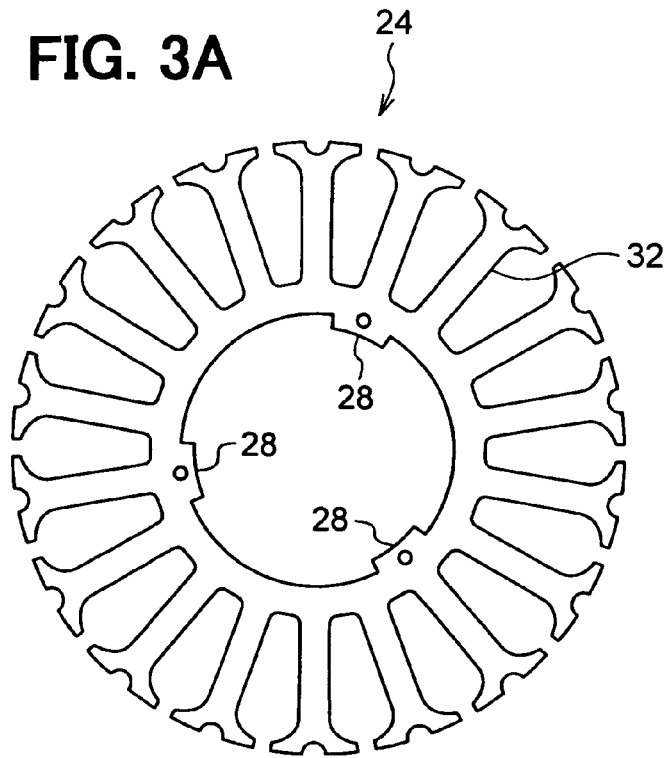
FIG. 3A is a plan view of a first core subassembly of the brushless motor of FIG. 1.
Figure 3B:
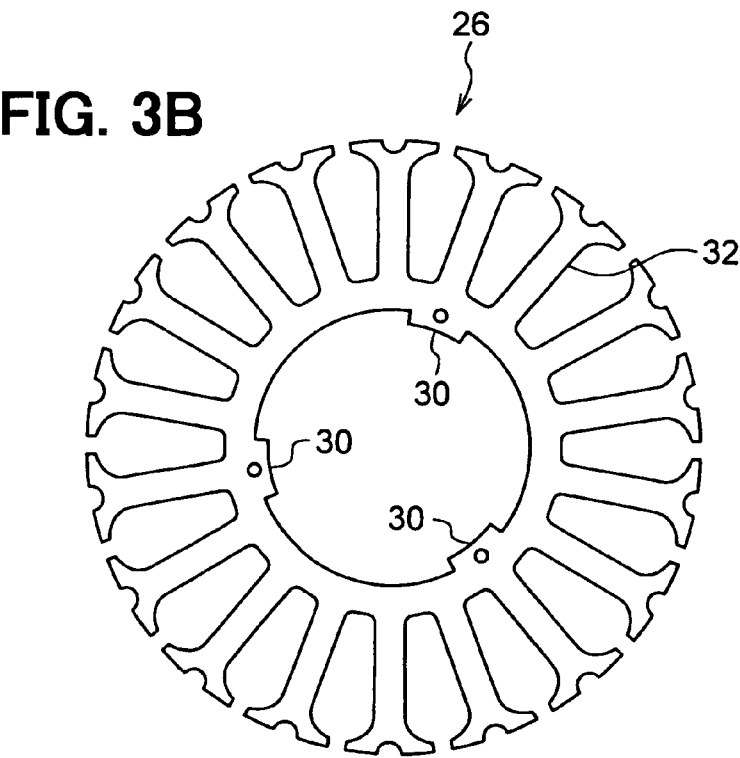
FIG. 3B is a plan view of a second core subassembly of the brushless motor of FIG. 1.

The stator 12 includes a cup-shaped stator housing (lower motor housing) 15 and an annular stator core 22. The stator housing 15 is fixed to an external support structure, such as a vehicle body. The stator core 22 is supported by a centerpiece 18 of the stator housing 15 through the vibration isolator 20. The stator core 22 is formed as a laminated core, which is formed by stacking a plurality of thin core plates one after another in an axial direction. More specifically, the stator core 22 includes a first core subassembly 24 and a second core subassembly 26. The first core assembly 24 is formed by stacking and joining a plurality of thin core plates one after another in the axial direction. Similarly, the second core assembly 26 is formed by stacking and joining a plurality of thin core plates one after another in the axial direction. The first core subassembly 24 and the second core subassembly 26 are joined together, for example, by welding, bonding, staking or press fitting. In the case of the press fitting, undepicted engaging projections, which are provided in an axial end surface (a top end surface in FIG. 1) of the second core subassembly 26, are press fitted into undepicted engaging recesses, which are provided in an opposed end surface (a lower end surface) of the first core subassembly 24. As shown in FIGS. 2 and 3A, a plurality (three in this instance) of first-side inner peripheral protrusions 28 radially inwardly protrudes from an inner peripheral surface of the first core subassembly 24. Furthermore, as shown in FIGS. 2 and 3B, a plurality (three in this instance) of second-side inner peripheral protrusions 30 radially inwardly protrude from an inner peripheral surface of the second core subassembly 26. The first-side inner peripheral protrusions (serving as inner peripheral engaging portions) 28 are spaced from each other and are arranged one after another in a circumferential direction of the stator core 22 (circumferential direction of the rotatable shaft 14). Similarly, the second-side inner peripheral protrusions 30 are spaced from each other and are arranged one after another in the circumferential direction of the stator core 22.

Figure 12:
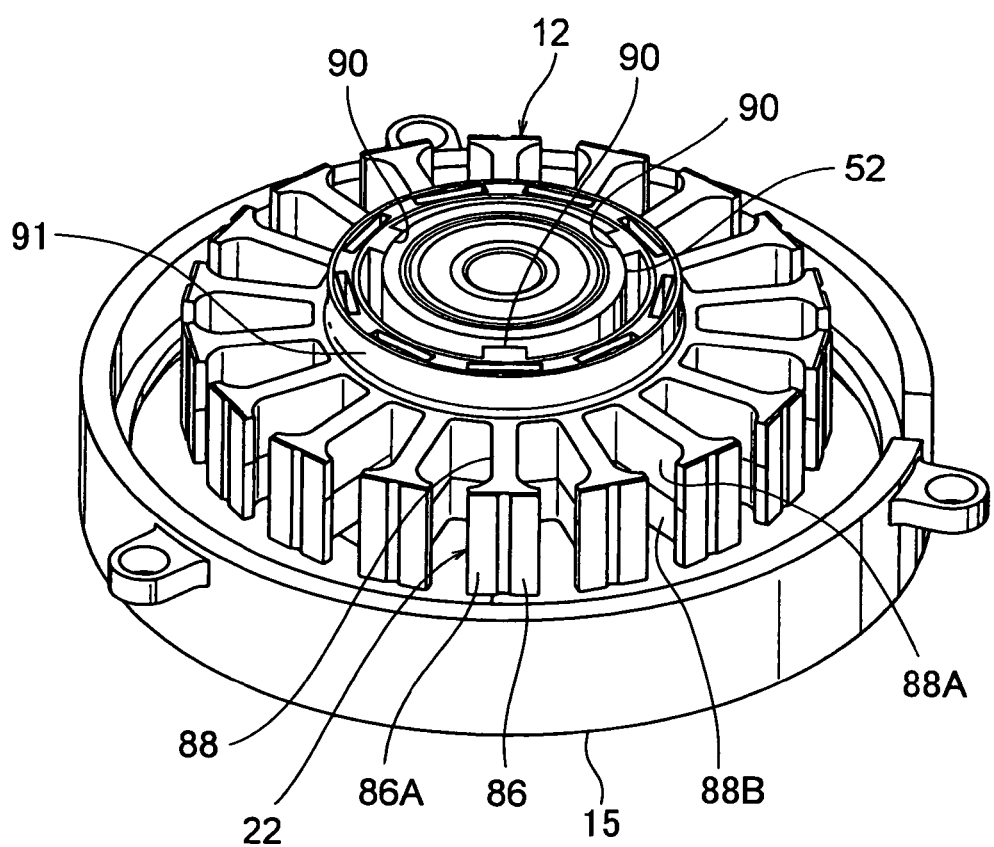
FIG. 12 is a perspective view showing another modification of the brushless motor of the embodiment without a plurality of windings wound around salient poles of the stator core.
Figure 13:
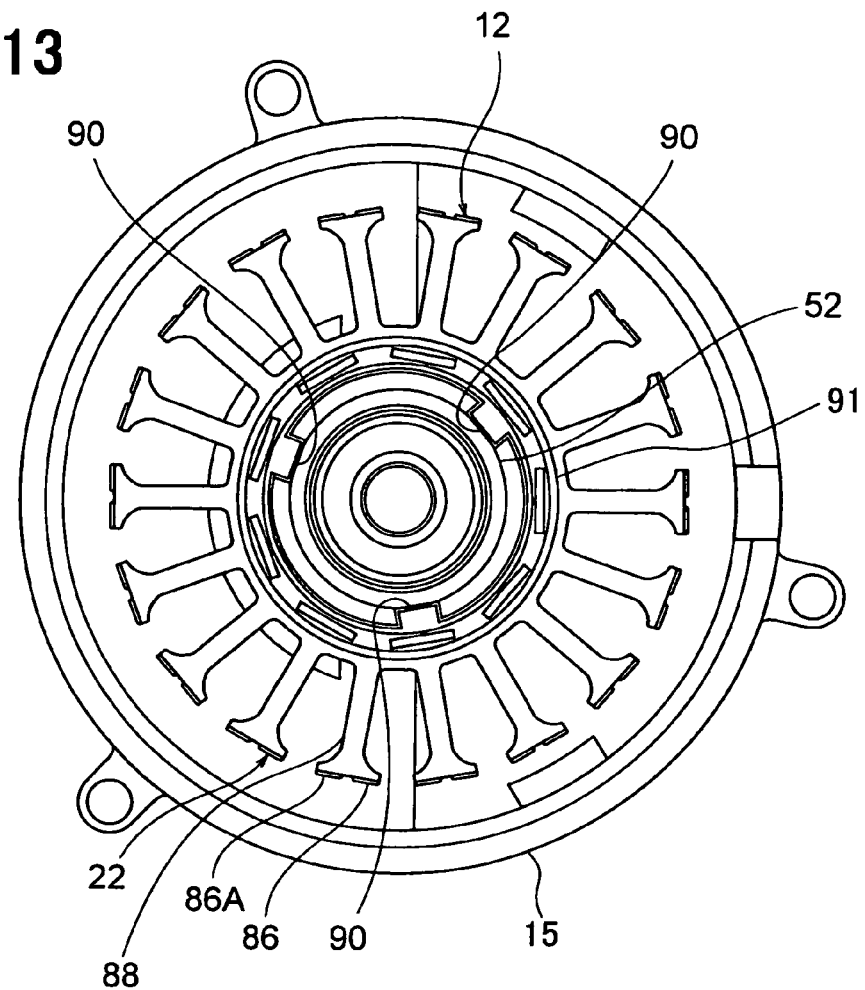
FIG. 13 is a plan view of the brushless motor shown in FIG. 12.

Although not depicted in FIGS. 1 and 2, an insulator (similar to an insulator 88 of FIG. 12 made of a dielectric resin material) is installed to the stator core 22. Windings (similar to windings 110 of FIG. 14) are wound around salient poles 32 of the stator core 22 through the insulator. The stator 12, which includes the stator housing 15, the stator core 22, the insulator and the windings, generates a rotational magnetic field when electric current is supplied from a circuit board (not shown) to the windings of the stator 12.

As shown in FIG. 1, the rotatable shaft 14 is rotatably supported by the centerpiece 18 such that the rotatable shaft 14 is placed radially inward of the stator core 22 and extends in the axial direction.

A tubular fitting portion 38 is formed in the center of a bottom portion 36 of the rotor housing 34. A distal end portion of the rotatable shaft 14 is securely fitted into the fitting portion 38, so that the rotatable shaft 14 is rotated integrally with the rotor housing 34. Rotor magnets 42 (FIG. 4) are fixed to an inner peripheral surface of a cylindrical portion (outer peripheral wall) 40 of the rotor housing 34. The rotor magnets 42 are radially opposed to the stator core 22 of the stator 12.

Figure 4:
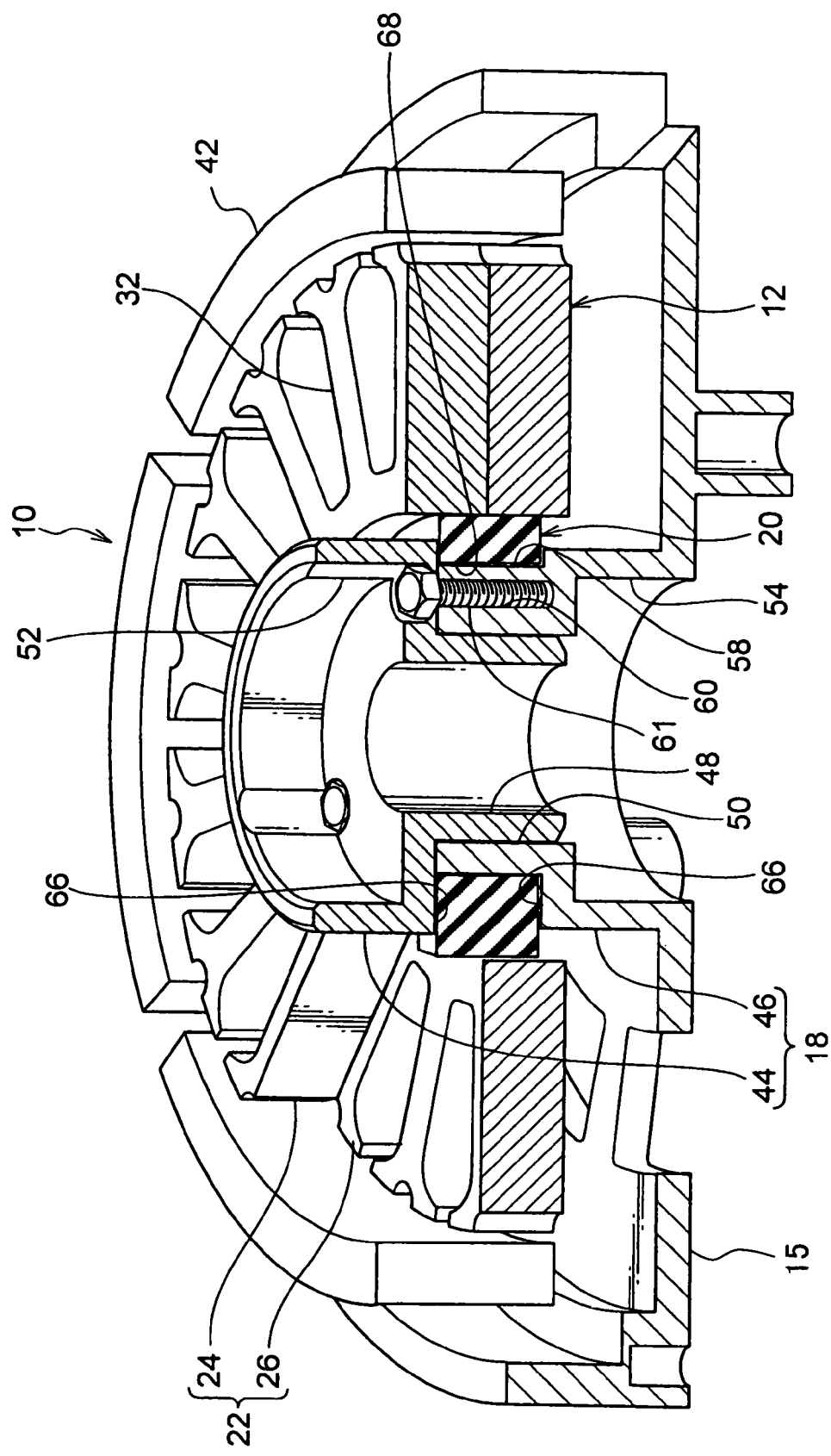
FIG. 4 is a partially fractured schematic perspective view showing the brushless motor of FIG. 1.

As shown in FIG. 4, the centerpiece 18 includes a first centerpiece segment (an upper centerpiece segment) 44 and a second centerpiece segment (a lower centerpiece segment) 46. The first centerpiece segment 44 and the second centerpiece segment 46 have tubular shaft portions (serving as center portions) 48, 50, respectively, which are located at the center thereof and are placed radially inward of the stator core 22. The first centerpiece segment 44 also has a cup-shaped bearing receiving portion 52, which is formed integrally with the shaft portion 48. Similarly, the second centerpiece segment 46 also has a cup-shaped bearing receiving portion 54, which is formed integrally with the shaft portion 50 that is, in turn, formed integrally with the rest of the stator housing 15.

Figure 5:
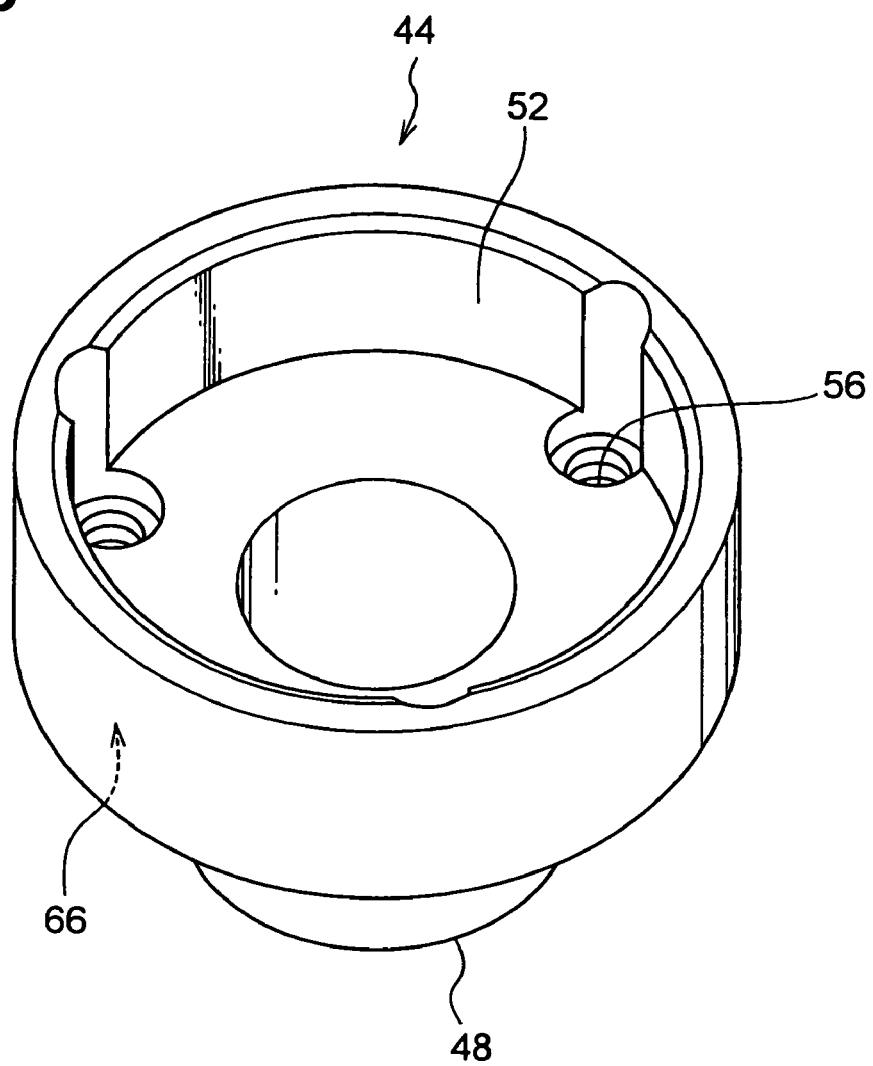
FIG. 5 is a perspective view of a first centerpiece segment of a centerpiece of the brushless motor of FIG. 1.
Figure 6:
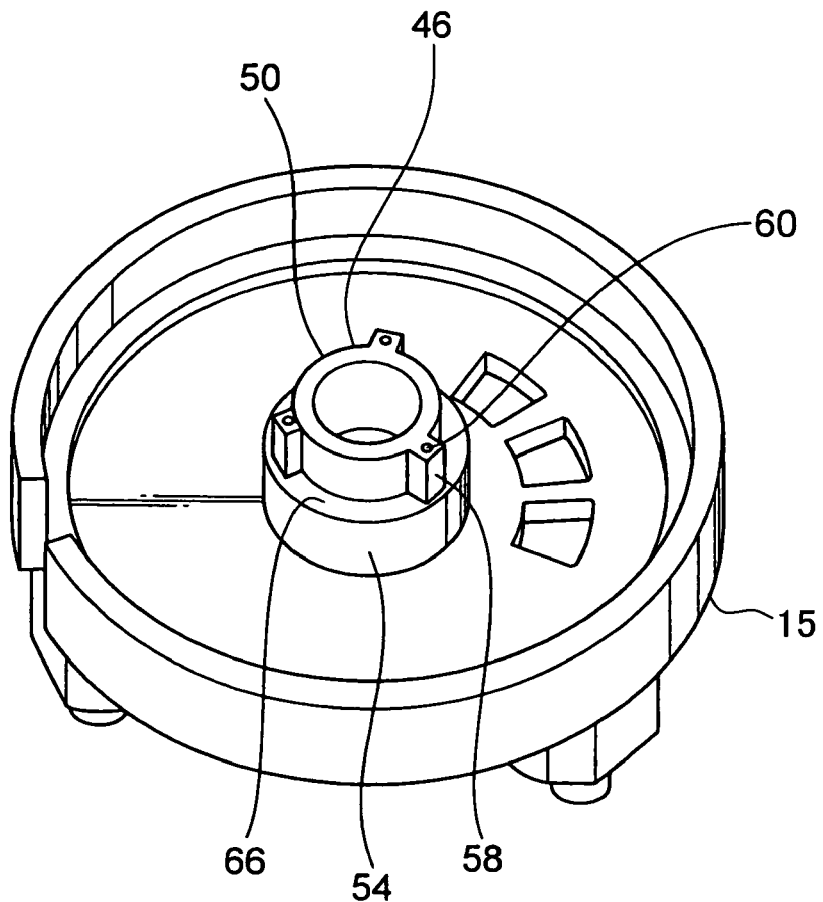
FIG. 6 is a perspective view of a stator housing having a second centerpiece segment of the centerpiece at a center thereof.

As shown in FIG. 5, a plurality (three in this instance) of bolt receiving holes 56 is formed in the bearing receiving portion 52 of the first centerpiece segment 44 such that the bolt receiving holes 56 are spaced from one after another in the circumferential direction and axially penetrate through a wall of the bearing receiving portion 52 of the first centerpiece segment 44. As shown in FIG. 6, a plurality of outer peripheral protrusions (serving as outer peripheral engaging portions) 58 is formed in an outer peripheral surface of the shaft portion 50 of the second centerpiece segment 46. Each outer peripheral protrusion 58 is elongated in the axial direction of the shaft portion 50 and has a threaded screw hole 60, which extends in the axial direction.

As shown in FIG. 4, the shaft portion 48 of the first centerpiece segment 44 is inserted into the shaft portion 50 of the second centerpiece segment 46 such that the shaft portion 48 is placed radially inward of the shaft portion 50. Bolts 61 are inserted through the bolt receiving holes 56, respectively, of the bearing receiving portion 52 of the first centerpiece segment 44 and are threaded into the threaded screw holes 60 of the shaft portion 50 of the second centerpiece segment 46. In this way, the first centerpiece segment 44 and the second centerpiece segment 46 are assembled together.

Furthermore, as shown in FIG. 1, two bearings 62, 64 are received in the bearing receiving portions 52, 54, respectively, of the first and second centerpiece segments 44, 46, which are assembled together in the above described manner. Furthermore, as shown in FIG. 1, the rotatable shaft 14 is inserted into the shaft portion 48 of the first centerpiece segment 44 and is rotatably supported by the bearings 62, 64, which are received in the bearing receiving portions 52, 54.

Figure 7:
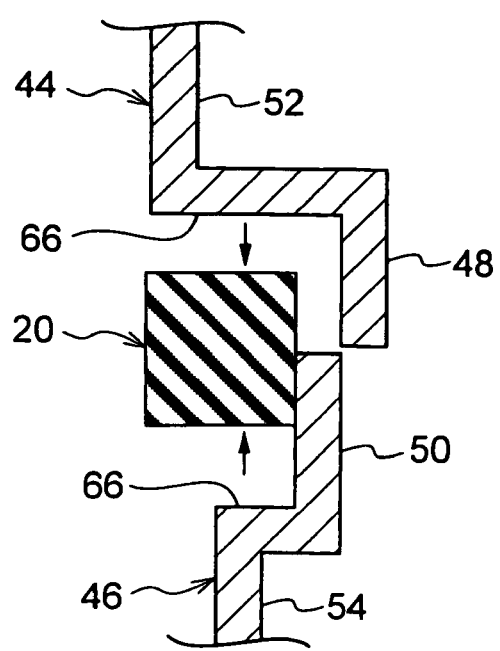
FIG. 7 is an enlarged partial cross sectional view of the centerpiece of the brushless motor of FIG. 1.

Furthermore, as shown in FIG. 4, the bearing receiving portions (serving as bearing portions) 52, 54 of the first and second centerpiece segments 44, 46, which are assembled together in the above described manner, are spaced from each other in the axial direction of the shaft portions 48, 50. As shown in FIGS. 4 and 7, a lower end surface of the bearing receiving portion 52 and an upper end surface of the bearing receiving portion 54, which are opposed to each other in the axial direction, form clamping surfaces (serving as first and second clamping portions) 66, respectively. The clamping surfaces 66 clamp the vibration isolator 20 therebetween in the axial direction.

Figure 8:
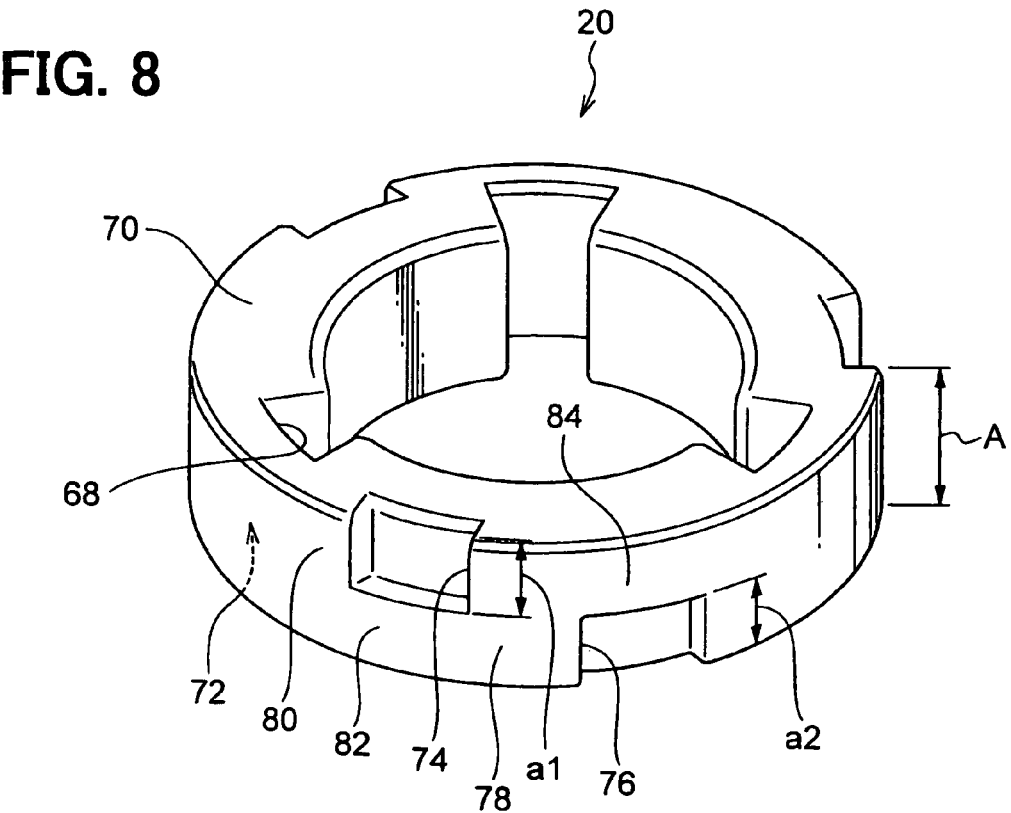
FIG. 8 is a perspective view of a vibration isolator of the brushless motor of FIG. 1.

The vibration isolator 20 is made of, for example, rubber or resin, which has a spring constant equal to or less than 50 N/mm and can damp vibrations of 80 Hz or higher frequencies. Furthermore, as shown in FIG. 8, the vibration isolator 20 is configured into a generally cylindrical body. A plurality of inner peripheral recesses (serving as inner peripheral engaging portions) 68 is formed in an inner peripheral surface of the vibration isolator 20. These inner peripheral recesses 68 are spaced from each other in a circumferential direction of the vibration isolator 20 (circumferential direction of the rotatable shaft 14). Each inner peripheral recess 68 extends in the axial direction of the vibration isolator 20 and opens in opposed end surfaces (first and second axial end surfaces) 70, 72 of the vibration isolator 20.

A plurality of first-side outer peripheral recesses 74 and a plurality of second-side outer peripheral recesses 76 are formed in an outer peripheral surface of the vibration isolator 20. Each first-side outer peripheral recess 74 extends in the axial direction along the outer peripheral surface of the vibration isolator 20 such that an upper end (first end) of the first-side outer peripheral recess 74 opens in the upper end surface (first end surface) 70 of the vibration isolator 20 while a lower end (second end) of the first-side outer peripheral recess 74 is terminated at an axially intermediate portion of the vibration isolator 20. Each second-side outer peripheral recess 76 extends in the axial direction along the outer peripheral surface of the vibration isolator 20 such that an upper end (first end) of the second-side outer peripheral recess 76 is terminated at the axially intermediate portion of the vibration isolator 20 while a lower end (second end) of the second-side outer peripheral recess 76 opens in the lower end surface (second end surface) 72 of the vibration isolator 20.

As shown in FIG. 8, an axial length a1 of the first-side outer peripheral recess 74 and an axial length a2 of the second-side outer peripheral recess 76 are respectively set to be about one half of an axial length A of vibration isolator 20.

Figure 9:
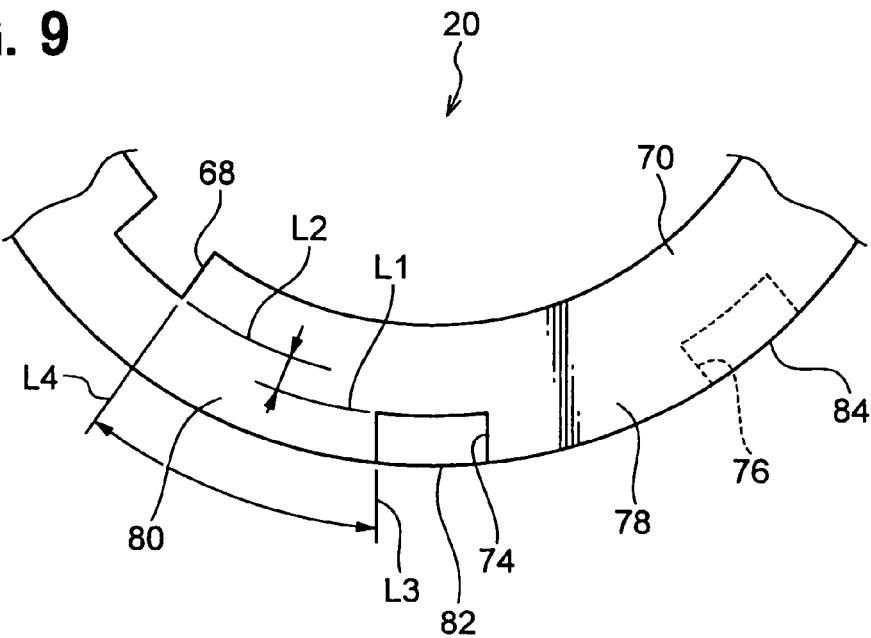
FIG. 9 is an enlarged partial plan view of the vibration isolator of FIG. 8.

The first-side outer peripheral recesses 74 are spaced from each other in the circumferential direction of the vibration isolator 20. Also, the second-side outer peripheral recesses 76 are spaced from each other in the circumferential direction of the vibration isolator 20 and are also spaced from the first-side outer peripheral recesses 74 in the circumferential direction. Furthermore, each first-side outer peripheral recess 74 and each second-side outer peripheral recess 76 are respectively spaced from any adjacent one of the inner peripheral recesses 68 in both of the radial direction and the circumferential direction of the vibration isolator 20. Specifically, as shown in FIG. 9, a circumferential imaginary line L1, which extends along a radially inner bottom surface of the first-side outer peripheral recess 74, is spaced from a circumferential imaginary line L2, which extends along a radially outer bottom surface of the inner peripheral recess 68, in the radial direction of the vibration isolator 20. Also, a radial imaginary line L3, which extends along a circumferential lateral surface of the first-side outer peripheral recess 74, is spaced from a radial imaginary line L4, which extends along an adjacent circumferential lateral surface of the adjacent inner peripheral recess 68, in the circumferential direction of the vibration isolator 20.

As shown in FIG. 4, the vibration isolator 20 is axially clamped between the clamping surfaces 66 and is radially placed between the stator core 22 and the shaft portion 50. Furthermore, the inner peripheral recesses 68 of the vibration isolator 20 are axially fitted to the outer peripheral protrusions 58, respectively, of the shaft portion 50 of the second centerpiece segment 46 in the axial direction of the vibration isolator 20. In addition, the first-side outer peripheral recesses 74 and the second-side outer peripheral recesses 76 of the vibration isolator 20 are fitted to the first-side inner peripheral protrusions 28 and the second-side inner peripheral protrusions 30, respectively, of the stator core 22.

In the above-described state where the vibration isolator 20 is axially clamped between the clamping surfaces 66 and is radially placed between the stator core 22 and the shaft portion 50, the vibration isolator 20 can absorb or damp the circumferential and axial vibrations transmitted from the stator core 22.

Next, a manufacturing method of the brushless motor 10 according to the present embodiment will be described.

For example, the above-described brushless motor 10 is manufactured (assembled) as follows. That is, in a first manufacturing process, the first core subassembly 24 and the second core subassembly 26 are moved toward the vibration isolator 20 in the axial direction. Then, the first-side inner peripheral protrusions 28 of the first core subassembly 24 are axially downwardly fitted into the first-side outer peripheral recesses 74 of the vibration isolator 20. Furthermore, the second-side inner peripheral protrusions 30 of the second core subassembly 26 are axially upwardly fitted into the second-side outer peripheral recesses 76 of the vibration isolator 20. As discussed above, in the first manufacturing process, the first core subassembly 24 and the second core subassembly 26 are installed to the vibration isolator 20 from the opposite axial sides, respectively, and are joined together in a manner discussed above.

Next, in a second manufacturing process, the insulator (similar to the insulator 88 of FIG. 12) is installed to the stator core 22, which includes the first core subassembly 24 and the second core subassembly 26. The windings (similar to the windings 110 of FIG. 14) are wound around the salient poles 32 of the stator core 22 through the insulator.

Then, in a third manufacturing process, the first centerpiece segment 44 and the second centerpiece segment 46 are moved toward the vibration isolator 20 from the opposite axial sides, respectively, of the vibration isolator 20. Then, the vibration isolator 20 is axially clamped between the clamping surface 66 of the first centerpiece segment 44 and the clamping surface 66 of the second centerpiece segment 46. At this time, the outer peripheral protrusions 58 of the second centerpiece segment 46 are axially upwardly fitted into the inner peripheral recesses 68 of the vibration isolator 20. As discussed above, in the third manufacturing process, the first centerpiece segment 44 and the second centerpiece segment 46 are axially installed to the vibration isolator 20 from the opposite axial sides, respectively, to clamp the vibration isolator 20 therebetween. Then, the first centerpiece segment 44 and the second centerpiece segment 46 are held together by the bolts 61.

Thereafter, in a fourth manufacturing process, the bearings 62, 64, the rotatable shaft 14 and the rotor housing 34 having the magnets 42 are respectively installed. That is, for example, the bearings 62, 64 are inserted into the bearing receiving portions 52, 54, respectively, of the first and second centerpiece segments 44, 46. Also, the rotatable shaft 14 is inserted into and is supported by the bearings 62, 64. Furthermore, the rotatable shaft 14 is inserted into the shaft portion 50 of the first centerpiece segment 44. Also, the distal end portion of the rotatable shaft 14 is fitted into the fitting portion 38 of the rotor housing 34. Here, it should be noted that the installation of the bearings 62, 64 into the bearing receiving portions 52, 54 may be performed in the above-described third manufacturing process. According to the above manufacturing method, the brushless motor 10 can be reliably manufactured.

Next, an operation of the brushless motor 10 according to the present embodiment will be described.

In the brushless motor 10 of the present embodiment, when the rotational magnetic field is generated at the stator 12, the rotor 16 is rotated by the rotational magnetic field. In general, in the case of the brushless motor 10 of the above type, when the rotor 16 is rotated, the attractive and repulsive forces of the rotor magnets 42, which are installed to the rotor 16, are applied to the stator core 22 of the stator 12. Thereby, the stator core 22 is vibrated. Particularly, when a cogging torque is generated on the rotor 16, the vibrations of the stator core 22 become large.

However, in the case of the brushless motor 10 of the present embodiment, the shaft portions 48, 50 of the centerpiece 18, which support the rotatable shaft 14, are placed radially inward of the annular stator core 22, and the vibration isolator 20 is radially placed between the stator core 22 and the shaft portion 50. The vibration isolator 20 is constructed to absorb or damp the circumferential and axial vibrations, which are transmitted from the stator core 22. Thus, with the above construction, even when the circumferential and axial vibrations are generated in the stator core 22, these vibrations are absorbed or damped by the vibration isolator 20 to limit the transmission of the vibrations to the centerpiece 18. In this way, the motor noise can be reduced.

Particularly, the first-side outer peripheral recesses 74 and the second-side outer peripheral recesses 76 of the vibration isolator 20, which are respectively fitted to the first-side inner peripheral protrusions 28 and the second-side inner peripheral protrusions 30 of the stator core 22, are spaced from each other in the circumferential direction of the vibration isolator 20. Thus, each thick wall portion 78, which is thick in the radial direction, is circumferentially placed between the corresponding first-side outer peripheral recess 74 and the corresponding adjacent second-side outer peripheral recess 76 (see FIGS. 8 and 9). Therefore, even when the circumferential vibrations are generated in the stator core 22, these vibrations can be reliably absorbed or damped by the thick wall portions 78.

Furthermore, the inner peripheral recesses 68, which are provided in the inner peripheral surface of the vibration isolator 20, are radially and circumferentially spaced from the outer peripheral recesses 74, 76, which are provided in the outer peripheral surface of the vibration isolator 20. Thus, each thick wall portion 80, which is thick in both of the radial direction and the circumferential direction, is formed between the corresponding inner peripheral recess 68 and the corresponding adjacent outer peripheral recess 74, 76 (see FIGS. 8 and 9). Therefore, even when the circumferential vibrations are generated in the stator core 22, these vibrations can be reliably absorbed or damped by the thick wall portions 80.

Furthermore, as shown in FIG. 8, each first-side outer peripheral recess 74 and the adjacent second-side outer peripheral recess 76 of the vibration isolator 20 are circumferentially spaced from each other and open on the opposed end surfaces 70, 72, respectively, of the vibration isolator 20. Thus, each vibration absorbing portion (vibration damping portion) 82, 84 is formed axially adjacent to the corresponding one of the first-side outer peripheral recesses 74 and the second-side outer peripheral recesses 76. Therefore, even when the axial vibrations are generated in the stator core 22, these vibrations can be reliably absorbed or damped by the vibration absorbing portions 82, 84.

Furthermore, in the brushless motor 10 of the present embodiment, the first-side inner peripheral protrusions 28 and the second-side inner peripheral protrusions 30 of the stator core 22 are engaged with the first-side outer peripheral recesses 74 and the second-side outer peripheral recesses 76 of the vibration isolator 20 in the circumferential direction, and the outer peripheral protrusions 58 of the centerpiece 18 are engaged with the inner peripheral recesses 68 of the vibration isolator 20 in the circumferential direction. In this way, for example, the relative rotation of the vibration isolator 20 with respect to the stator core 22 and the centerpiece 18 can be reliably limited without using a fixing element, such as a screw.

Particularly, the inner peripheral recesses 68, which are recessed in the inner peripheral surface of the vibration isolator 20, are axially fitted to the outer peripheral protrusions 58 of the centerpiece 18, which extend in the axial direction of the vibration isolator 20. Therefore, an axial fitting range (axial engaging range) or a contact surface area between each outer peripheral protrusion 58 and the corresponding inner peripheral recess 68 can be made relatively large. In this way, the relative rotation of the vibration isolator 20 with respect to the centerpiece 18 can be further reliably limited.

Furthermore, the axially spaced clamping surfaces 66 are provided in the shaft portions 48, 50, respectively, of the centerpiece 18. The vibration isolator 20 is axially clamped between the clamping surfaces 66, so that the axial displacement of the vibration isolator 20 relative to the centerpiece 18 is limited. Therefore, the circumferential displacement of the vibration isolator 20 relative to the stator core 22 and the centerpiece 18 is limited, and the axial displacement of the vibration isolator 20 relative to the centerpiece 18 is limited. Also, the cylindrical outer and inner peripheral surfaces of the generally cylindrical vibration isolator 20 can provide a relatively large contact surface area or support surface area in comparison to a ring-shaped vibration isolator having a circular cross section, so that the generally cylindrical vibration isolator 20 can effectively limit tilting of the stator core 22 relative to the centerpiece 18. As a result, a deterioration in the rotational balance of the motor main body of the brushless motor 10 can be limited while the circumferential and axial vibrations, which are transmitted from the stator core 22, are effectively absorbed or damped (thereby, effectively exerting the vibration absorbing or damping effect) by the vibration isolator 20.

As described above, in the brushless motor 10 of the present embodiment, the motor noise can be reduced without deteriorating the rotational balance of the motor main body.

Furthermore, in the brushless motor 10 of the present embodiment, the clamping surfaces 66, which axially clamp the vibration isolator 20 therebetween, are provided in the bearing receiving portions 52, 54, which rotatably support the rotatable shaft 14. Thus, it is not required to provide the clamping surfaces 66 separately from the bearing receiving portions 52, 54, and thereby it is possible to simplify the structure of the clamping surfaces 66.

Furthermore, in the brushless motor 10 of the present embodiment, the stator core 22 is separated into the first core subassembly 24 and the second core subassembly 26. Also, the first-side outer peripheral recesses 74 and the second-side outer peripheral recesses 76 of the vibration isolator 20 are fitted to the first-side inner peripheral protrusions 28 of the first core subassembly 24 and the second-side inner peripheral protrusions 30 of the second core subassembly 26. Each first-side outer peripheral recess 74 and each second-side outer peripheral recess 76 of the vibration isolator 20 open in the opposed axial end surfaces 70, 72, respectively, of the vibration isolator 20. Therefore, the first core subassembly 24 and the second core subassembly 26 can be installed to the vibration isolator 20 by axially fitting each first-side inner peripheral protrusion 28 of the first core subassembly 24 and each second-side inner peripheral protrusion 30 of the second core subassembly 26 into the corresponding first-side outer peripheral recess 74 and the corresponding second-side outer peripheral recess 76, respectively, of the vibration isolator 20.

Furthermore, in the brushless motor 10 of the present embodiment, each inner peripheral recess 68 of the vibration isolator 20 opens in both of the axially opposed end surfaces 70, 72 of the vibration isolator 20. Thus, the outer peripheral protrusions 58 of the centerpiece 18 can be axially fitted into the inner peripheral recesses 68 of the vibration isolator 20.

Furthermore, in the brushless motor 10 of the present embodiment, the vibration isolator 20 is made of, for example, the rubber or resin, which has the spring constant equal to or less than about 50 N/mm and can damp the vibrations of 80 Hz or higher frequencies. Thus, the vibration isolator 20 of the present embodiment can reduce the motor noise of the lower frequencies, which are lower than those of the previously proposed vibration isolator.

Figure 10:
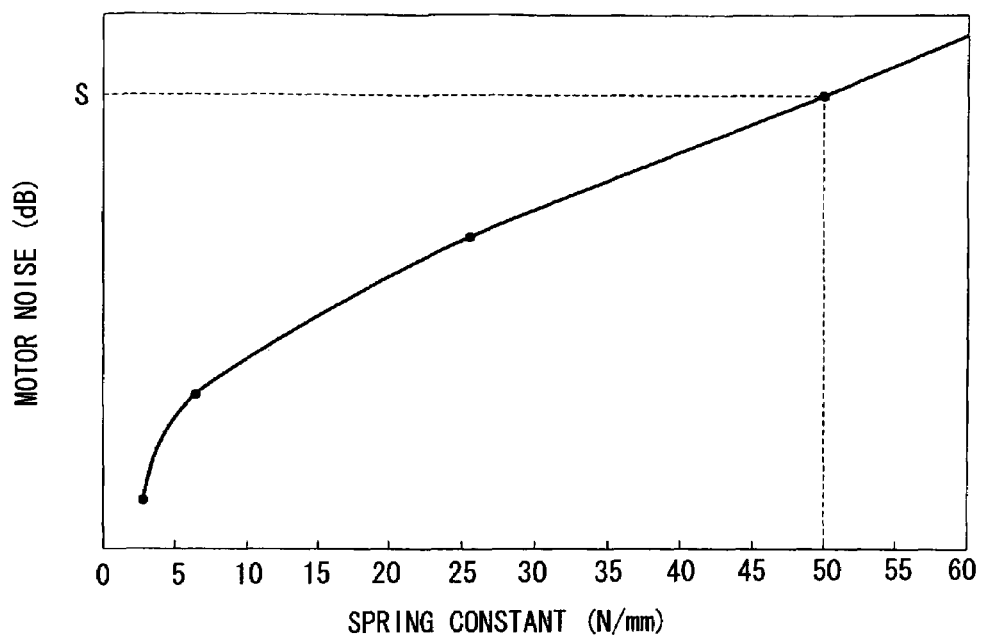
FIG. 10 is a diagram showing a relationship between a motor noise and a spring constant of the vibration isolator in a modification of the embodiment.

Specifically, in the previously proposed vibration isolator, the spring constant is larger than 50 N/mm. As shown in FIG. 10, when the spring constant becomes larger than 50 N/mm, the motor noise becomes larger than a predetermined value S. In contrast, the vibration isolator 20 of the present embodiment has the spring constant of equal to or less than 50 N/mm. Thus, as shown in FIG. 10, the motor noise can be reduced to equal to or less than the predetermined value S according to the present embodiment.

Figure 11:
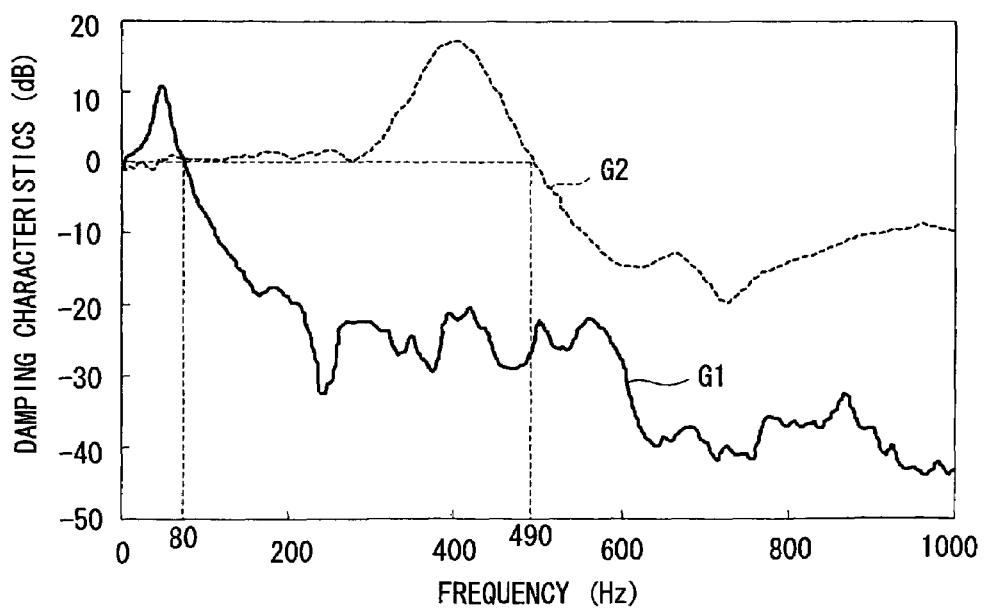
FIG. 11 is a diagram showing a relationship between damping characteristics and a frequency for illustrating a difference between vibration isolator of the modification of the embodiment and a previously proposed vibration isolator.

Furthermore, as indicated by a graph line G2 in FIG. 11, the previously proposed vibration isolator damps the vibrations of about 490 Hz or higher frequency. In contrast, as indicated by a graph line G1 in FIG. 11, the vibration isolator 20 of the present embodiment can damp the vibrations of about 80 Hz or higher frequencies. Thus, the vibration isolator 20 of the present embodiment can reduce the motor noise of the lower frequencies, which are lower than those of the previously proposed vibration isolator.

Although the present invention is described with reference to the above embodiment, the present invention is not limited to the above embodiment. Specifically, the above embodiment may be modified in various ways without departing from the spirit and scope of the present invention.

For example, in the above embodiment, the stator core 22 is made of the laminated core. Alternatively, a compacted core, which is made by compacting a powder core material, may be used as the stator core 22.

Furthermore, in the above embodiment, the first-side inner peripheral protrusions 28 and the second-side inner peripheral protrusions 30 are formed in the inner peripheral surface of the stator core 22, and the first-side outer peripheral recesses 74 and the second-side outer peripheral recesses 76 are formed in the outer peripheral surface of the vibration isolator 20. The first-side inner peripheral protrusions 28 and the second-side inner peripheral protrusions 30 of the stator core 22 are engaged with the first-side outer peripheral recesses 74 and the second-side outer peripheral recesses 76 of the vibration isolator 20 in the circumferential direction, so that the relative rotation of the vibration isolator 20 with respect to the stator core 22 is limited. Alternatively, engaging portions may be formed in the other part of the stator core 22, which is other than the inner peripheral surface of the stator core 22. Also, engaging portions may be formed in the other part of the vibration isolator 20, which is other than the outer peripheral surface of the vibration isolator 20. Then, the engaging portions of the stator core 22 may be engaged with the engaging portions of the vibration isolator 20 in the circumferential direction, so that the relative rotation of the vibration isolator 20 with respect to the stator core 22 is advantageously limited.

Furthermore, in the above embodiment, the outer peripheral protrusions 58 are formed in the outer peripheral surface of the shaft portion 50 of the centerpiece 18, and the inner peripheral recesses 68 are formed in the inner peripheral surface of the vibration isolator 20. Then, the outer peripheral protrusions 58 of the centerpiece 18 are engaged with the inner peripheral recesses 68 of the vibration isolator 20 in the circumferential direction, so that the relative rotation of the vibration isolator 20 with respect to the centerpiece 18 is limited. Alternatively, engaging portions may be formed in the other part of the centerpiece 18, which is other than the outer peripheral surface of the shaft portion 50, and the engaging portions may be formed in the other part of the vibration isolator 20, which is other than the inner peripheral surface of the vibration isolator 20. Then, the engaging portions of the centerpiece 18 may be engaged with the engaging portions of the vibration isolator 20 in the circumferential direction, so that the relative rotation of the vibration isolator 20 with respect to the centerpiece 18 is advantageously limited.

Figure 14:
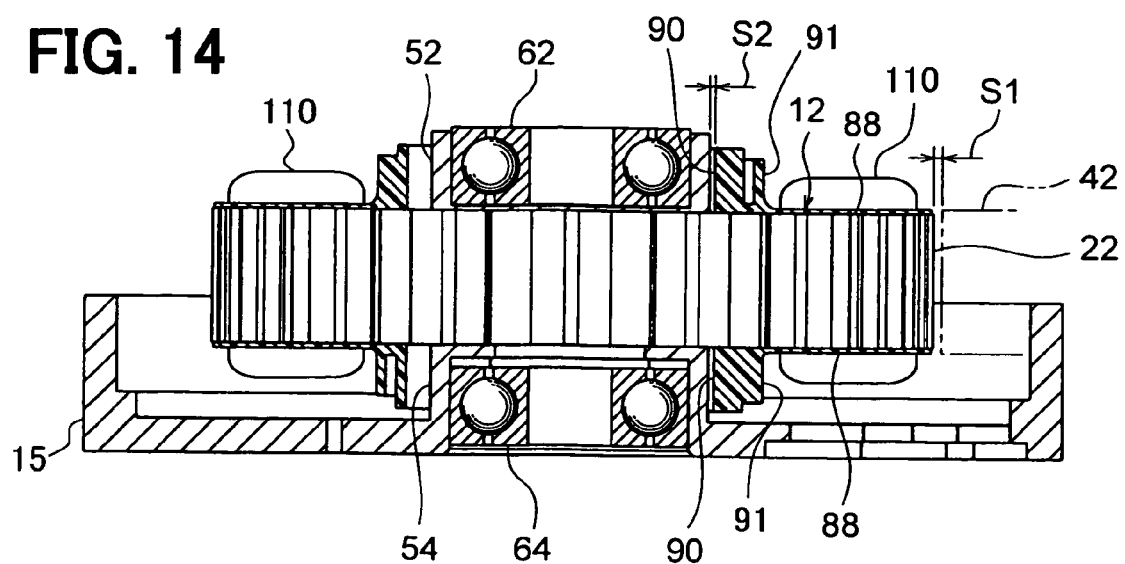
FIG. 14 is a partially fragmented side view showing the brushless motor of FIGS. 12 and 13 along with the windings wound around the salient poles of the stator core.
Figure 15:
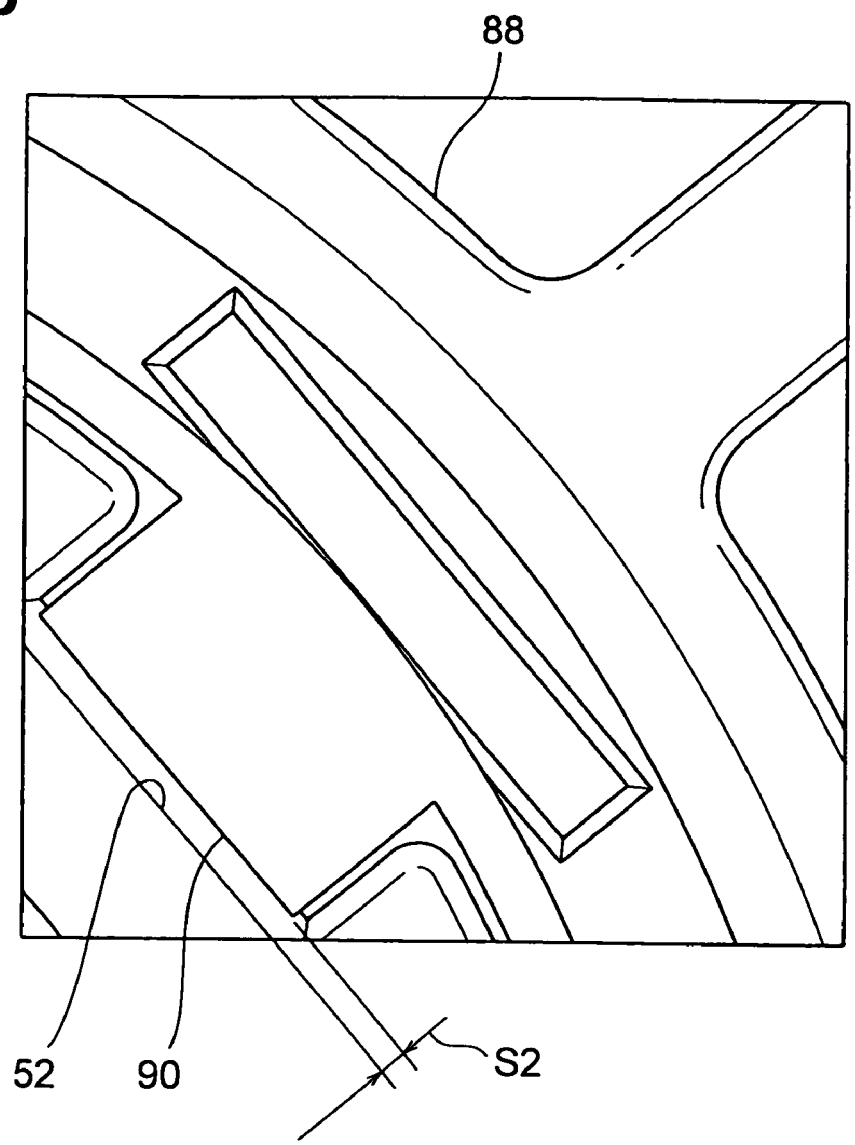
FIG. 15 is an enlarged partial plan view showing a radial gap between a bearing receiving portion and a stopper of an insulator of the brushless motor shown in FIGS. 12 to 14.

The above embodiment may be further modified as follows. Specifically, as shown in FIGS. 12 to 15, the stator 12 of this modification has the insulator 88, which is installed to the stator core 22 such that the insulator 88 covers an entire surface (including the inner peripheral surface of the stator core 22) except outer peripheral surfaces 86A of the salient poles 86. More specifically, the insulator 88 includes a first insulator segment 88A and a second insulator segment 88B, which are axially installed to the stator core 22 from opposite axial sides, respectively. Then, the windings 110 are wound around the salient poles 32 through the insulator 88 (first and second insulator segments 88A, 88B), as indicated in FIG. 14. Three first-side stoppers 90 radially inwardly protrudes from an inner peripheral surface of the first insulator segment 88A (more specifically, from an inner peripheral surface of an inner peripheral wall 91 of the first insulator segment 88A), and three second-side stoppers 90 radially inwardly protrude from an inner peripheral surface of the second insulator segment 88B (more specifically, from an inner peripheral surface of an inner peripheral wall 91 of the second insulator segment 88B).

Specifically, as shown in FIG. 14, the first-side stoppers 90 of the first insulator segment 88A are provided radially outward of the bearing receiving portion 52, and the second side stoppers 90 of the second insulator segment 88B are provided radially outward of the bearing receiving portion 54. The first-side stoppers 90, which are opposed to the bearing receiving portion 52, receive and cover the first-side inner peripheral protrusions 28. Also, the second-side stoppers 90, which are opposed to the bearing receiving portion 54, receive and cover the second-side inner peripheral protrusions 30.

In this modification, as shown in FIG. 14, a radial gap S1 between the outer peripheral surface of the stator core 22 (the outer peripheral surface 86A of each salient pole 86) and the inner peripheral surface of the radially opposed rotor magnet 42 is set to be larger than a radial gap S2 between a radially inner end of each stopper 90 and the outer peripheral surface of the radially opposed bearing receiving portion 52, 54 (i.e., S1>S2).

According to this modification, since the radial gap S2 is made smaller than the radial gap S1, at the time of tilting of the stator core 22 relative to the centerpiece 18, an axial end of each corresponding stopper 90 can engage with the outer peripheral surface of the centerpiece 18 (more specifically, the bearing receiving portions 52, 54) before an axial end of the outer peripheral surface of the stator core 22 engages the inner peripheral surface of the corresponding magnet 42. That is, when the vibrations occur in the stator 12 or the rotor 16, the stoppers 90 engage the outer peripheral surfaces of the bearing receiving portions 52, 54. Thus, the contact (interference) between the outer peripheral surface of the stator core 22 (the outer peripheral surfaces of the salient poles) and the inner peripheral surfaces of the rotor magnets 42 can be advantageously limited.

Figure 16:
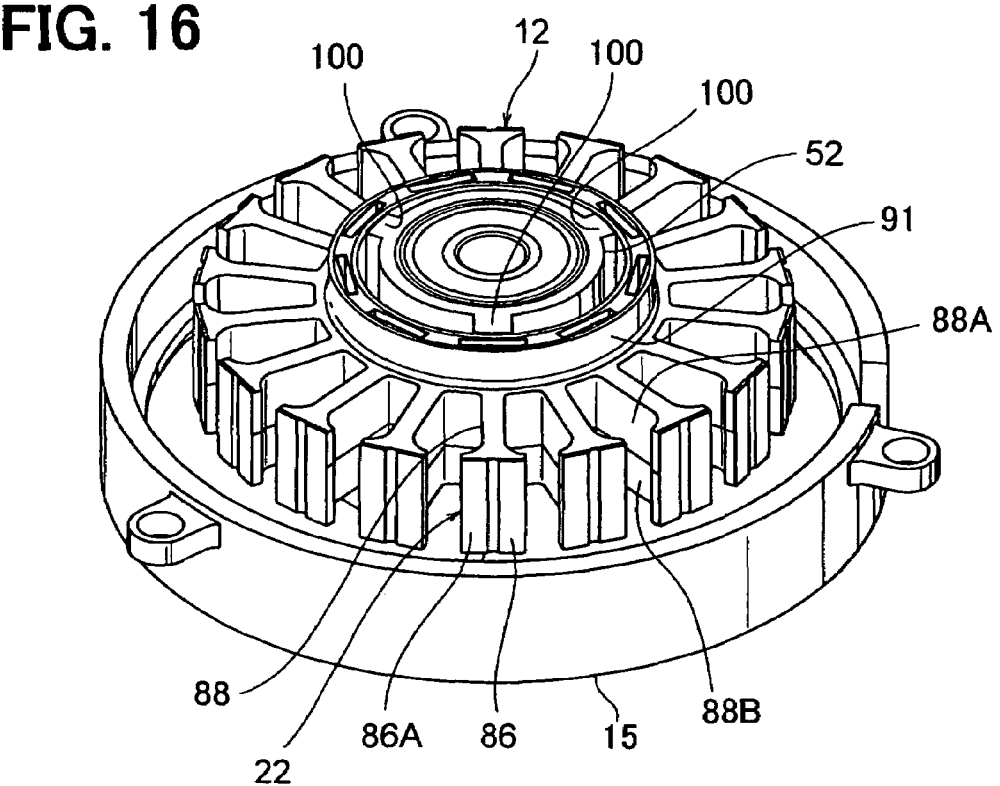
FIG. 16 is a perspective view similar to FIG. 12, showing another modification of the brushless motor of the embodiment.

Alternatively, as shown in FIG. 16, in another modification, in place of the stoppers 90, radially outwardly protruding first-side stoppers 100 may be formed in the outer peripheral surface of the bearing receiving portion 52, and radially outwardly protruding second-side stoppers 100 may be provided in the outer peripheral surface of the bearing receiving portion 54. In such a case, the radial gap S1 between the outer peripheral surface of the stator core 22 (the outer peripheral surface 86A of each salient pole 86) and the inner peripheral surface of the radially opposed rotor magnet 42 is set to be larger than the radial gap S2 between a radially outer end of each stopper 100 and the inner peripheral surface of the inner peripheral wall 91 of the insulator 88 (i.e., S1>S2).

Even in this modification, when the vibrations occur in the stator 12 or the rotor 16, the first-side and second-side stoppers 100 engage the inner peripheral surface of the insulator 88. Thus, the contact (interference) between the outer peripheral surface of the stator core 22 (the outer peripheral surfaces of the salient poles) and the inner peripheral surfaces of the rotor magnets 42 can be advantageously limited.

Further alternatively, radially inwardly protruding stoppers may be formed in the inner peripheral surface of the insulator 88, and radially outwardly protruding stoppers may be formed in the outer peripheral surfaces of the bearing receiving portions 52, 54 to radially oppose the radially inwardly protruding stoppers, respectively. In such a case, the radial gap S1 between the outer peripheral surface of the stator core 22 (the outer peripheral surface 86A of each salient pole 86) and the inner peripheral surface of the radially opposed rotor magnet 42 is set to be larger than the radial gap S2 between a radially outer end of each radially outwardly protruding stopper and a radially inner end of the adjacent radially inwardly protruding stopper (i.e., S1>S2).

Even in this modification, when the vibrations occur in the stator 12 or the rotor 16, the radially outer end of the corresponding radially outwardly protruding stopper and the radially inner end of the adjacent radially inwardly protruding stopper contact with each other. Thus, the contact (interference) between the outer peripheral surface of the stator core 22 (the outer peripheral surfaces of the salient poles) and the inner peripheral surfaces of the rotor magnets 42 can be advantageously limited.

Figure 17:
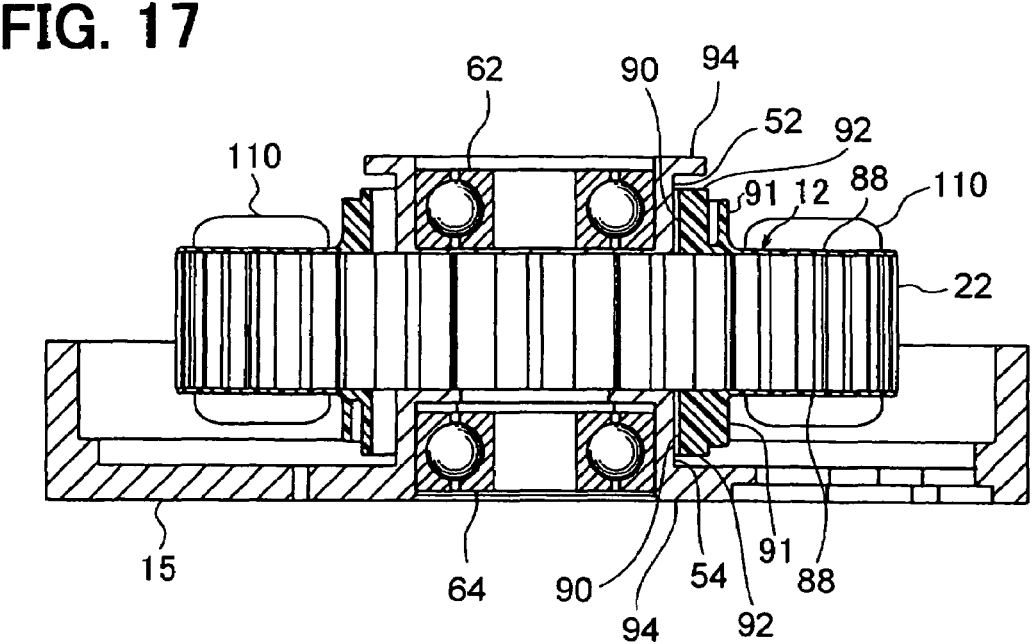
FIG. 17 is a diagram similar to FIG. 14, showing a further modification of the brushless motor shown in FIG. 14.

Furthermore, in the modification shown in FIGS. 12 to 15, as shown in FIG. 17, a radially outwardly protruding first flange 94 may be provided to the axially outer end of the bearing receiving portion 52 at a location adjacent to one axial end 92 of the stator 12 to axially oppose thereto. Also, a radially outwardly protruding second flange 94 may be provided to the axially outer end of the bearing receiving portion 54 at a location adjacent to the other axial end 92 of the stator 12 to axially oppose thereto. With such a construction, the axial movement of the stator 12 can be advantageously limited by the flanges 94.

Additional advantages and modifications will readily occur to those skilled in the art. The invention in its broader terms is therefore not limited to the specific details, representative apparatus, and illustrative examples shown and described.

What is claimed is:

1. A brushless motor comprising:
   a rotor that includes a rotatable shaft;
   a centerpiece that rotatably supports the rotatable shaft therein;
   a stator core that is placed radially outward of the centerpiece; and
   a generally cylindrical vibration isolator that is made of a resilient material and is radially placed between the centerpiece and the stator core, wherein the stator core is supported by the centerpiece only through the vibration isolator, wherein
   the centerpiece includes first and second clamping portions, which are spaced from each other and are opposed to each other in an axial direction of the rotatable shaft; and
   the vibration isolator is axially clamped between the first and second clamping portions of the centerpiece.

2. The brushless motor according to claim 1, wherein:
   a radially outer portion of the vibration isolator is axially clamped by the stator core; and
   a radially inner portion of the vibration isolator is axially clamped by the centerpiece.

3. The brushless motor according to claim 1, wherein:
   at least one of the stator and the centerpiece includes at least one engaging portion; and
   the vibration isolator includes at least one engaging portion, which is engaged with the at least one engaging portion of the at least one of the stator and the centerpiece in a circumferential direction of the rotatable shaft.

4. The brushless motor according to claim 1, wherein:
   the centerpiece includes at least one outer peripheral engaging portion, which is formed in an outer peripheral surface of the centerpiece; and
   the vibration isolator includes at least one inner peripheral engaging portion that is formed in an inner peripheral surface of the vibration isolator and is engaged with the at least one outer peripheral engaging portion of the centerpiece in a circumferential direction of the rotatable shaft.

5. The brushless motor according to claim 4, wherein:
   each of the at least one outer peripheral engaging portion of the centerpiece is formed as an outer peripheral protrusion, which protrudes radially outward from the outer peripheral surface of the centerpiece; and
   each of the at least one inner peripheral engaging portion of the vibration isolator is formed as an inner peripheral recess, which is recessed radially outward from the inner peripheral surface of the vibration isolator.

6. The brushless motor according to claim 5, wherein:
   each outer peripheral protrusion of the centerpiece extends in an axial direction of the rotatable shaft; and
   each inner peripheral recess of the vibration isolator extends in the axial direction and opens in first and second axial end surfaces of the vibration isolator.

7. The brushless motor according to claim 1, wherein: the stator core includes at least one inner peripheral engaging portion; and
   the vibration isolator includes at least one outer peripheral engaging portion, which is engaged with the at least one inner peripheral engaging portion of the stator core in a circumferential direction of the rotatable shaft.

8. The brushless motor according to claim 7, wherein:
   the at least one inner peripheral engaging portion of the stator core includes at least one first-side inner peripheral protrusion and at least one second-side inner peripheral protrusion, which protrude radially inward from an inner peripheral surface of the stator core; and
   the at least one outer peripheral engaging portion of the vibration isolator includes at least one first-side outer peripheral recess and at least one second-side outer peripheral recess, which are recessed radially inward from an outer peripheral surface of the vibration isolator such that the at least one first-side outer peripheral recess is spaced from the at least one second-side outer peripheral recess in the circumferential, and the at least one first-side outer peripheral recess and the at least one second-side outer peripheral recess are engaged with the at least one first-side inner peripheral protrusion and the at least one second-side inner peripheral protrusion, respectively, of the stator core.

9. The brushless motor according to claim 8, wherein:
   the stator core includes a first core subassembly and a second core subassembly, which are placed one after another in an axial direction of the rotatable shaft;
   the at least one first-side inner peripheral protrusion is provided in the first core subassembly;
   the at least one second-side inner peripheral protrusion is provided in the second core subassembly;

each of the at least one first-side outer peripheral recess of the vibration isolator extends along the outer peripheral surface of the vibration isolator in the axial direction such that a first axial end of the first-side outer peripheral recess opens in a first axial end surface of the vibration isolator, and a second axial end of the first-side outer peripheral recess is terminated in an axially intermediate portion of the vibration isolator; and each of the at least one second-side outer peripheral recess of the vibration isolator extends along the outer peripheral surface of the vibration isolator in the axial direction such that a first axial end of the second-side outer peripheral recess is terminated in the axially intermediate portion of the vibration isolator, and a second axial end of the second-side outer peripheral recess opens in a second axial end surface of the vibration isolator.

10. The brushless motor according to claim 7, wherein:
the centerpiece includes at least one outer peripheral engaging portion, which is formed in an outer peripheral surface of the centerpiece; and
the vibration isolator further includes at least one inner peripheral engaging portion that is formed in an inner peripheral surface of the vibration isolator and is engaged with the at least one outer peripheral engaging portion of the centerpiece in the circumferential direction.

11. The brushless motor according to claim 10, wherein:
each of the at least one inner peripheral engaging portion of the stator core is formed as an inner peripheral protrusion, which protrudes radially inward from the inner peripheral surface of the stator core;
each of the at least one outer peripheral engaging portion of the centerpiece is formed as an outer peripheral protrusion, which protrudes radially outward from the outer peripheral surface of the centerpiece;
each of the at least one inner peripheral engaging portion of the vibration isolator is formed as an inner peripheral recess, which is recessed radially outward from the inner peripheral surface of the vibration isolator; and
each of the at least one radially outer engaging portion of the vibration isolator is formed as an outer peripheral recess, which is recessed radially inward from the outer peripheral surface of the vibration isolator.

12. The brushless motor according to claim 1, wherein:
the centerpiece further includes at least one bearing portion, which rotatably supports the rotatable shaft; and
the first and second clamping portions are formed in the at least one bearing portion.

13. The brushless motor according to claim 1, wherein:
the stator core includes at least one inner peripheral engaging portion, which is formed in an inner peripheral surface of the stator core;
the centerpiece further includes at least one outer peripheral engaging portion, which is formed in an outer peripheral surface of the centerpiece; and
the vibration isolator includes:
at least one inner peripheral engaging portion, which is formed in an inner peripheral surface of the vibration isolator and is engaged with the at least one outer peripheral engaging portion of the centerpiece in a circumferential direction of the rotatable shaft; and
at least one outer peripheral engaging portion, which is formed in an outer peripheral surface of the vibration isolator and is engaged with the at least one inner peripheral engaging portion of the stator core in the circumferential direction.

14. The brushless motor according to claim 1, further comprising an insulator, which covers at least an inner peripheral surface of the stator core, wherein:
the rotor further includes at least one rotor magnet, which is placed radially outward of the stator core such that a first predetermined radial gap is formed between an outer peripheral surface of the stator core and the at least one rotor magnet;
the insulator includes at least one stopper, which protrudes radially inward and forms a second radial gap between an outer peripheral surface of the centerpiece and the at least one stopper; and
the first predetermined radial gap is larger than the second predetermined radial gap.

15. The brushless motor according to claim 1, further comprising an insulator, which covers at least an inner peripheral surface of the stator core, wherein:
the rotor further includes at least one rotor magnet, which is placed radially outward of the stator core such that a predetermined first radial gap is formed between an outer peripheral surface of the stator core and the at least one rotor magnet;
the centerpiece includes at least one stopper, which protrudes radially outward from the centerpiece and forms a second predetermined radial gap between an inner peripheral surface of the insulator and the at least one stopper; and
the first predetermined radial gap is larger than the second predetermined radial gap.

16. The brushless motor according to claim 1, wherein the resilient material of the vibration isolator is one of a rubber material and a resin material, which has a spring constant of 50 N/mm or less and damps vibrations of 80 Hz or higher frequencies.

17. The brushless motor according to claim 1, wherein:
the centerpiece includes first and second flanges, which are provided at first and second axial ends, respectively, of the centerpiece and are axially opposed to each other; and
the first and second flanges of the centerpiece are axially opposed to first and second axial ends, respectively, of the stator core.

18. A manufacturing method of a brushless motor, comprising:
assembling a stator core and a vibration isolator made of a resilient material together by engaging at least one inner peripheral engaging portion of the stator core to at least one outer peripheral engaging portion of the vibration isolator;
winding a plurality of windings around a plurality of salient poles of the stator core after the assembling of the stator core and the vibration isolator; and
assembling a centerpiece and the vibration isolator together by axially clamping the vibration isolator between first and second clamping portions of the centerpiece and engaging at least one outer peripheral engaging portion of the centerpiece to at least one inner peripheral engaging portion of the vibration isolator after the winding of the plurality of windings so that the stator core is supported by the centerpiece only through the vibration isolator.

* * * * *